(12) United States Patent
Tavakoli-Targhi et al.

(10) Patent No.: US 10,016,936 B2
(45) Date of Patent: Jul. 10, 2018

(54) HYBRID METAL POLYMER INTERLOCK

(71) Applicant: Dura Operating, LLC, Auburn Hills, MI (US)

(72) Inventors: Ali Tavakoli-Targhi, Rochester Hills, MI (US); Suhant Prajwal Reddy Ranga, Northville, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 216 days.

(21) Appl. No.: 14/928,168

(22) Filed: Oct. 30, 2015

(65) Prior Publication Data

US 2017/0120509 A1    May 4, 2017

(51) Int. Cl.
| | |
|---|---|
| *B29C 65/02* | (2006.01) |
| *B29C 65/00* | (2006.01) |
| *F16B 19/04* | (2006.01) |
| *B29K 101/12* | (2006.01) |
| *B29K 105/12* | (2006.01) |
| *B29L 31/00* | (2006.01) |
| *F16B 5/04* | (2006.01) |

(52) U.S. Cl.
CPC .......... *B29C 66/304* (2013.01); *B29C 66/721* (2013.01); *B29C 66/742* (2013.01); *B29C 66/7422* (2013.01); *B29C 66/74283* (2013.01); *F16B 19/04* (2013.01); *B29K 2101/12* (2013.01); *B29K 2105/12* (2013.01); *B29K 2995/0077* (2013.01); *B29L 2031/7278* (2013.01); *F16B 5/045* (2013.01)

(58) Field of Classification Search
CPC ......... B29C 66/304; F16B 19/04; F16B 5/045
USPC ......................................................... 411/501
See application file for complete search history.

(56) References Cited

U.S. PATENT DOCUMENTS

| | | | | |
|---|---|---|---|---|
| 2,270,266 A | * | 1/1942 | Cavanagh | B62D 25/18 280/163 |
| 2,899,347 A | * | 8/1959 | Kindseth | B29C 65/42 156/209 |
| 3,451,853 A | * | 6/1969 | Spahrbier | B22D 19/00 164/109 |
| 3,544,143 A | * | 12/1970 | Ohlsson | B29C 65/607 29/509 |

(Continued)

FOREIGN PATENT DOCUMENTS

| | | | |
|---|---|---|---|
| CA | 2905266 A1 | * | 9/2014 |
| CN | 101479090 A | | 7/2009 |

(Continued)

*Primary Examiner* — Flemming Saether
(74) *Attorney, Agent, or Firm* — Robert E. Ford; Raymond J. Vivacqua; Steven L. Crane

(57) ABSTRACT

A mechanical coupling assembly that includes a primary substrate having at least one aperture formed therein. A secondary substrate includes at least one mechanical interlock monolithically formed with the secondary substrate. The at least one mechanical interlock extends through the aperture. The mechanical interlock includes a main body and a head portion with a transition portion connecting the main body and head portions. The main body includes a bore formed longitudinally therein about a centerline of the aperture. The mechanical interlock joins the primary substrate and secondary substrate mechanically.

29 Claims, 4 Drawing Sheets

(56) References Cited

U.S. PATENT DOCUMENTS

| | | | | |
|---|---|---|---|---|
| 3,821,052 | A | * | 6/1974 | Tanzer ................ B29C 66/304 156/250 |
| 5,190,803 | A | * | 3/1993 | Goldbach ........... B29C 37/0085 264/261 |
| 5,826,376 | A | * | 10/1998 | Yamamoto ........... B29C 65/606 411/506 |
| 6,793,261 | B2 | | 9/2004 | McLeod et al. |
| 7,010,845 | B2 | * | 3/2006 | Muller ..................... F16B 5/02 29/509 |
| 7,063,811 | B2 | | 6/2006 | Brozenick et al. |
| 7,334,828 | B2 | * | 2/2008 | Budde .................. B60G 7/001 280/781 |
| 8,250,725 | B2 | * | 8/2012 | Sigler ................ B29C 37/0085 156/293 |
| 8,262,155 | B2 | | 9/2012 | Leanza |
| 2012/0210558 | A1 | * | 8/2012 | Logan ................. B23P 11/005 29/527.5 |

FOREIGN PATENT DOCUMENTS

| | | | | |
|---|---|---|---|---|
| DE | 102007044428 | A1 | | 3/2009 |
| DE | 102010054195 | A1 | | 6/2012 |
| EP | 370342 | A2 | | 8/1993 |
| EP | 0629785 | A2 | * 12/1994 | ............ B29C 65/18 |
| EP | 1084816 | A2 | | 3/2001 |
| EP | 1600272 | A1 | | 11/2005 |

\* cited by examiner

HYBRID METAL POLYMER INTERLOCK

FIELD OF THE INVENTION

The invention relates to mechanical coupling assemblies for joining dissimilar materials.

BACKGROUND OF THE INVENTION

Generally, two dissimilar materials may be joined using a mechanical fastener such as a screw, rivet, bolt, or other known mechanical fastener. Additionally, such dissimilar materials may be joined together using adhesives or bonding agents to attach the two components together. Such adhesives and mechanical fasteners often require complicated and cost intensive assembly operations.

There is therefore a need in the art for an improved mechanical coupling of dissimilar parts that is cost effective and reduces the use of labor intensive manufacturing techniques such as adhesive bonding and mechanical attachments such as screws or rivets. There is also a need in the art for an improved mechanical coupling assembly that allows for weight reduction, performance improvement, as well as improved structural properties when joining two dissimilar components. There is a further need in the art for an improved method and mechanical coupling assembly that utilizes an over-molding or comolding technique joining two dissimilar parts to meet a desired performance and loading characteristic.

SUMMARY OF THE INVENTION

In one aspect, there is disclosed a mechanical coupling assembly that includes a primary substrate having at least one aperture formed therein. The primary substrate includes a first surface and an opposing second surface separated by a material thickness. A secondary substrate includes at least one mechanical interlock monolithically formed with the secondary substrate. The at least one mechanical interlock extends through the aperture and spans the first and second surfaces. The mechanical interlock includes a main body disposed proximate the first surface and a head portion disposed proximate the second surface with a transition portion connecting the main body and head portions. The main body includes a bore formed longitudinally therein about a centerline of the aperture. The mechanical interlock joins the primary substrate and secondary substrate mechanically.

In another aspect there is disclosed a mechanical coupling assembly that includes a metal primary substrate having at least one aperture formed therein. The primary substrate includes a first surface and an opposing second surface separated by a material thickness. A polymeric secondary substrate includes at least one mechanical interlock monolithically formed with the secondary substrate. The at least one mechanical interlock extends through the aperture and spans the first and second surfaces. The mechanical interlock includes a main body disposed proximate the first surface and a head portion disposed proximate the second surface with a transition portion connecting the main body and head portion. The main body and head portion have a uniform thickness. The mechanical interlock connects the primary substrate and secondary substrate.

In yet a further aspect there is disclosed a method of forming a mechanical coupling assembly that includes the steps of: providing a primary substrate having at least one aperture formed therein, over-molding a secondary substrate onto the primary substrate forming a mechanical interlock, the mechanical interlock including a main body disposed proximate the first surface and a head portion disposed proximate the second surface with a transition portion connecting the main body and head portion, the main body includes a bore formed longitudinally therein about a centerline of the aperture such that the primary and secondary substrates are mechanically joined.

DETAILED DESCRIPTION OF THE PREFERRED EMBODIMENTS

Figure 1:
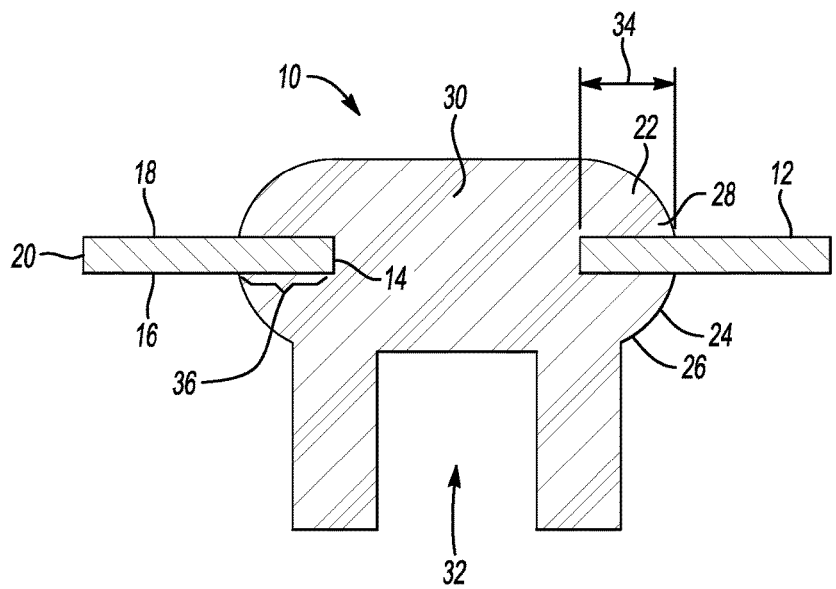
FIG. 1 is a sectional view of a mechanical coupling assembly.
Figure 2:
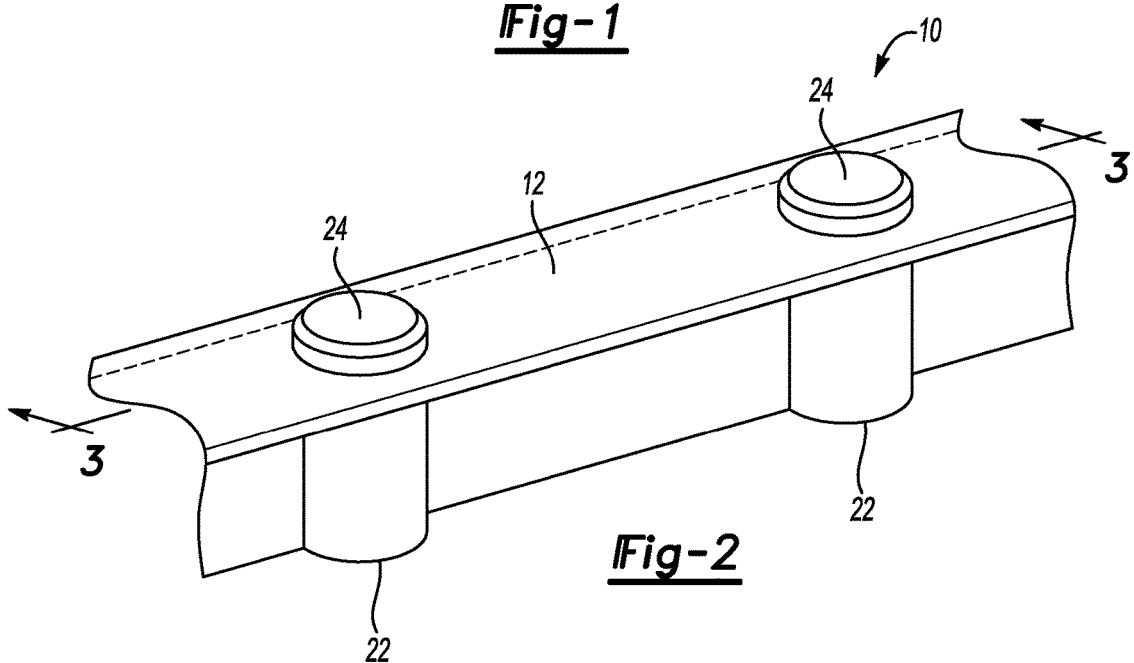
FIG. 2 is a perspective view of a mechanical coupling assembly.
Figure 3:
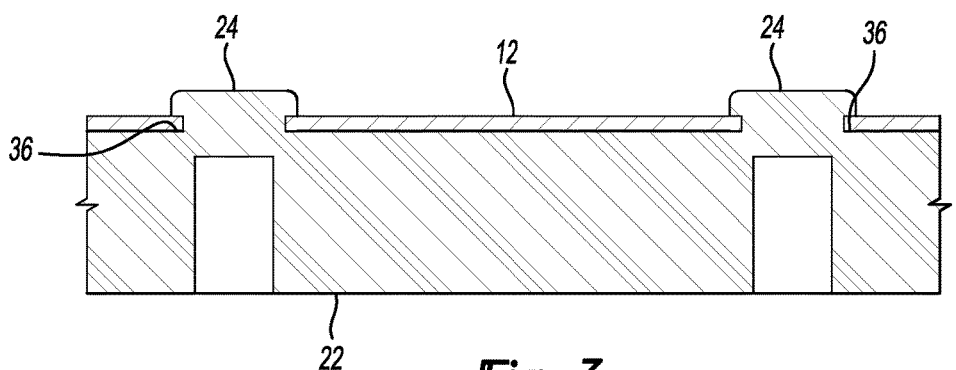
FIG. 3 is a front sectional view of the mechanical coupling assembly of FIG. 2.

Referring to FIGS. 1-3, there is shown a mechanical coupling assembly 10 that includes a primary substrate 12 having at least one aperture 14 formed therein. It should be realized that various numbers of apertures may be formed in the primary substrate 12. The primary substrate 12 includes a first surface 16 and an opposing second surface 18 that are separated by a material thickness 20. A secondary substrate 22 includes at least one mechanical interlock 24 monolithically formed with the secondary substrate 22. The at least one mechanical interlock 24 extends through the aperture 14 and spans the first and second surfaces 16, 18. The mechanical interlock 24 includes a main body 26 disposed proximate the first surface 16 and a head portion 28 disposed proximate the second surface 18. A transition portion 30 connects the main body 26 and head portion 28. In one aspect, the main body 26 includes a bore 32 formed longitudinally therein about a centerline of the aperture 14. The mechanical interlock 24 joins the primary and secondary substrates 12, 22 mechanically.

In one aspect, the bore 32 formed longitudinally about the centerline of the aperture 14 allows the main body 26 and head portion 28 to include a uniform thickness. The uniform thickness allows for specific design characteristics to be met as well as assures even flow and distribution of the secondary substrate 22 in an over-molding process alleviating potential failure modes of the mechanical interlock 24.

In one aspect, the main body 26 and head portions 28 extend radially about the aperture 14 the same distance. In other words, the shoulder width 34 of the main body 26 and head portion 28 are equal. It should be realized that different shoulder widths may also be utilized. As can be seen in FIG. 1, the head portion 28 extends radially about the aperture 14 a specified shoulder width 34. The same shoulder width 34 is provided on the main body portion 26. As described above, the transition portion 30 connects the head portion 28 and main body 26. In one aspect, the transition portion 30 includes a radial slot 36 defined therein that receives the primary substrate 12.

The primary substrate 12 may be formed of various materials that are dissimilar relative to the secondary substrate 22. In one aspect, the primary substrate 12 may be formed of a metal material such as, for example, aluminum, magnesium, steel, or other metal materials. The secondary substrate 22 may be formed of a polymeric material that is capable of flowing in an over-molding process. In one aspect, the polymeric material may include a fiber reinforced polymeric material, such as glass reinforced nylons, carbon fiber reinforced polymers and plastics and over-moldable reinforced thermo-plastics.

As described above, the main body 26 includes a bore 32 formed longitudinally therein about a centerline of the aperture 14. In one aspect, the bore 32 is sized to define the uniform thickness of the head portion 28 and the main body 26. Additionally, when a fiber reinforced polymeric material is utilized as the secondary substrate 22, the uniform thickness assures alignment of the fibers during the over-molding process, again avoiding potential failure modes of the mechanical interlock 24.

There is also disclosed a method of forming a mechanical coupling assembly 10 that includes the steps of providing a primary substrate 12 having at least one aperture 14 formed therein, over-molding a secondary substrate 22 onto the primary substrate 12 forming a mechanical interlock 24, the mechanical interlock 24 including a main body 26 disposed proximate the first surface 16 and a head portion 28 disposed proximate the second surface 18 with a transition portion 30 connecting the main body 26 and head portion 28. The main body 26 includes a bore 32 formed longitudinally therein about a centerline of the aperture 14. The bore 32 may be defined by a pin in the over molding process. The primary and secondary substrates 12, 22 are mechanically joined by the interlock 24.

Figure 4:
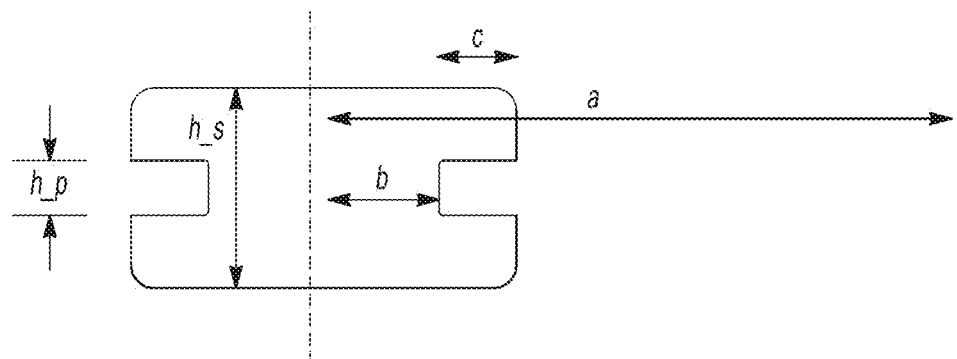
FIG. 4 is a schematic view detailing dimensions of a mechanical coupling assembly including the primary and secondary substrates.
Figure 5:
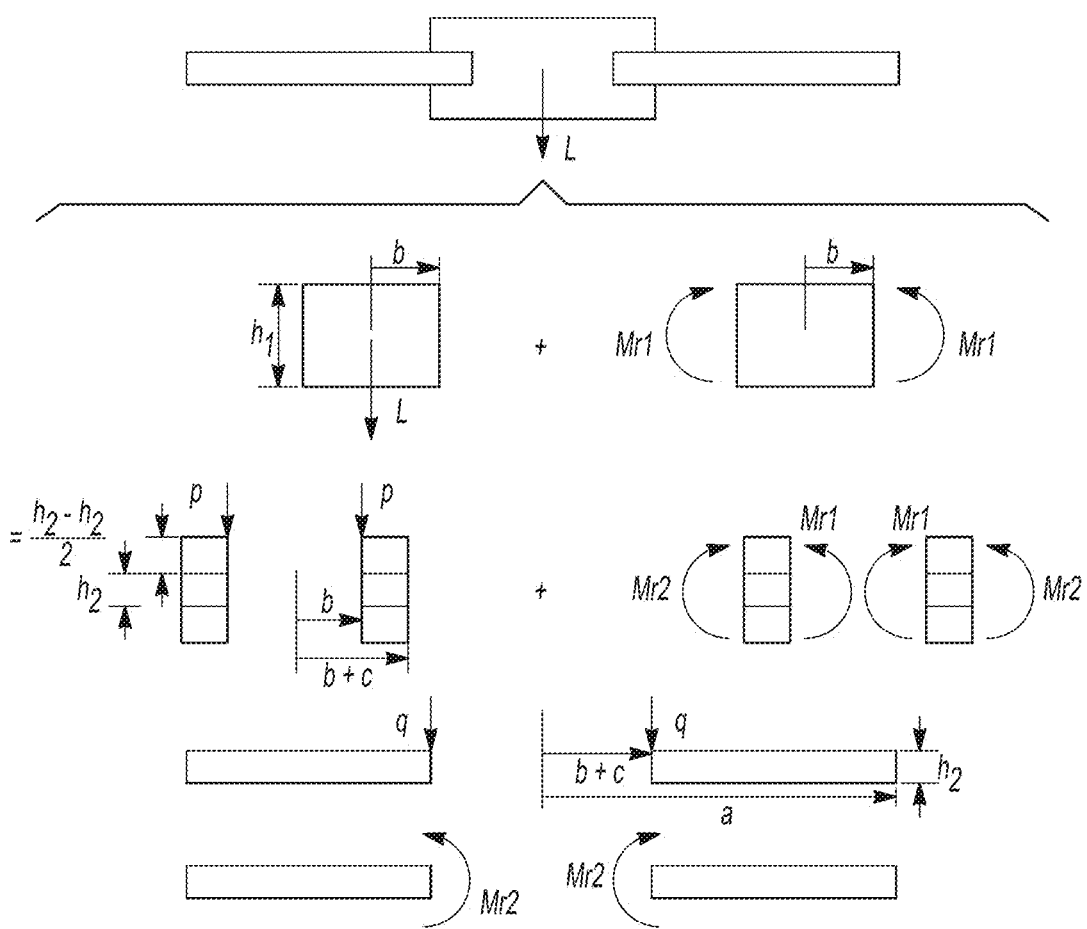
FIG. 5 is a schematic representation of a general solution for displacement including the radial, tangential, and shear stresses for different regions of a plate.

The method of forming a mechanical coupling assembly 10 includes specifying parameters of the primary and secondary substrates 12, 22. As shown in FIG. 4, in one aspect, the step of providing a primary substrate 12 includes determining an outer radius a of the primary substrate 12, determining a size b of the aperture 14, determining a thickness hp of the primary substrate 12, and selecting a primary substrate 12 material having a tensile modulus. The method also includes determining various parameters of the secondary substrate 22 in the step of over-molding. In one aspect, the step of over-molding includes determining a size b+c of the head portion 28, determining a thickness hs of the secondary substrate 22, and selecting a secondary substrate material having a tensile modulus. Referring to FIGS. 4 and 5, there are shown schematic representations of the parameters of the primary and secondary substrates 12, 22.

In one aspect, the step of over-molding includes calculating a polar solution for plate deflection with a point load at various positions (center of the interlock) using boundary conditions and solution continuity in accordance (with regions of different stiffness as in equation 1)

$$k_1 = \frac{E_s h_s^3}{12(1-v_s^2)}, k_2 = \frac{E_p h_p^3}{12(1-v_p^2)} + \frac{E_p(h_s - h_p)^3}{12(1-v_s^2)}, \quad (EQ\ 1)$$

$$k_3 = \frac{E_p h_p^3}{12(1-v_p^2)}$$

After calculating the polar solution, a radial, tangential, and shear stress are evaluated according to Equation 2:

$$\sigma_{Vonmises} = \sqrt{(\sigma_r^2 + \sigma_\theta^2 - \sigma_r \sigma_\theta + 3\tau^2)} \quad (EQ\ 2)$$

The radial, tangential and shear stress component should be lower than the material yield $\sigma_y$, for each region subject to the constraints:

$$b > 0, c > 0, (b+c) < \frac{a}{2}.$$

As shown in FIG. 5, the various parameters including the radial, tangential, and shear stresses are graphically depicted. In one aspect, the various stress components for the radial, tangential, and shear stresses are less than a mechanical yield of the secondary substrate.

Figure 6:
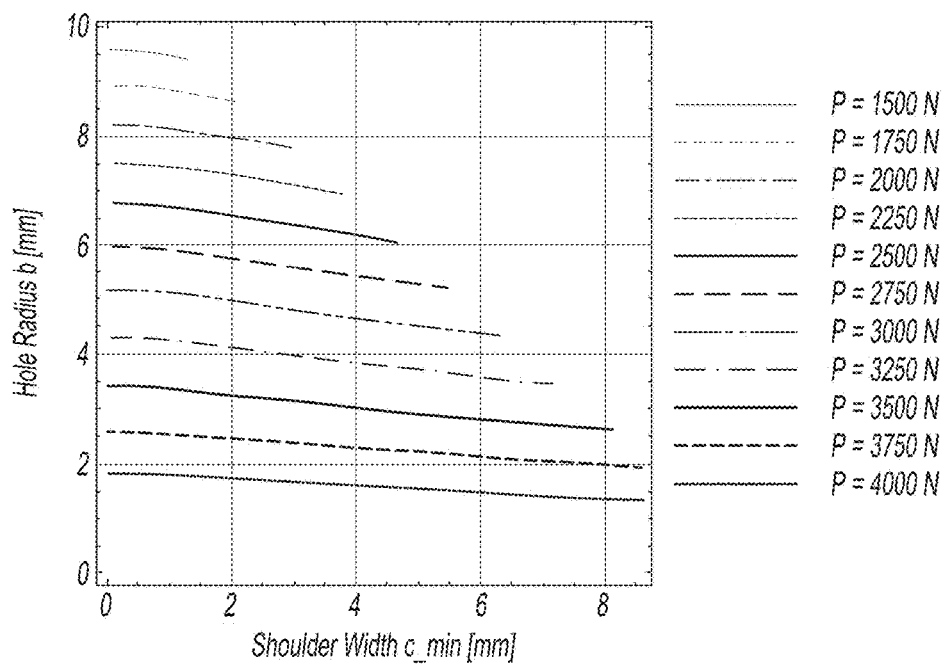
FIG. 6 is a plot of the shoulder width as a function of hole radius for various loads.

Referring to FIG. 6, there is shown a plot of the shoulder width of the secondary substrate 22 as a function of the hole radius of the primary substrate 12. The plot is sectioned for various load conditions. In one aspect, the plot is generated by initially providing variables b and c representative of the hole radius or aperture and shoulder width as shown in FIG. 4. Additionally, parameters are provided for the thickness of the primary substrate 12 which is set as 1 mm in the plot and the secondary substrate 22 which is set as 6 mm in the plot. Additionally, tensile moduli of the primary and secondary substrates 12, 22 are set at 70 and 2 GPa respectively. It should be realized that various sizes and thicknesses as well as tensile modulus may be utilized as determined by the design parameters of the primary and secondary substrates 12, 22. The following plots are utilized to demonstrate the process using one set of parameters for exemplary purposes.

Figure 7:
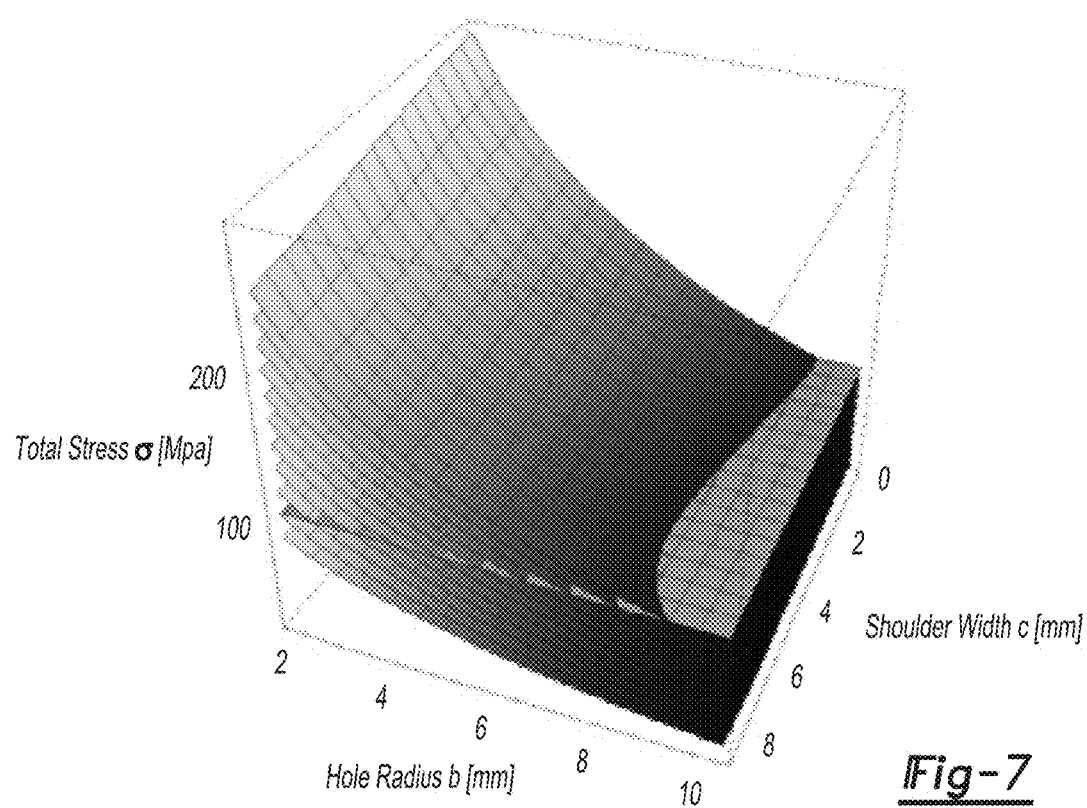
FIG. 7 is a plot of the hole radius, shoulder width, and total stress.

Referring to FIG. 7, there is shown a plot of the hole radius and shoulder width as a function of the total stress. In one aspect, the plot is generated such that the step of over-molding includes sectioning the calculated values of the radial, tangential, and shear stress using a yield stress plane as well as the size of the aperture and the size of the head. Again, it should be realized that these plots may be generated for various materials for both the primary and secondary substrates 12, 22.

Figure 8:
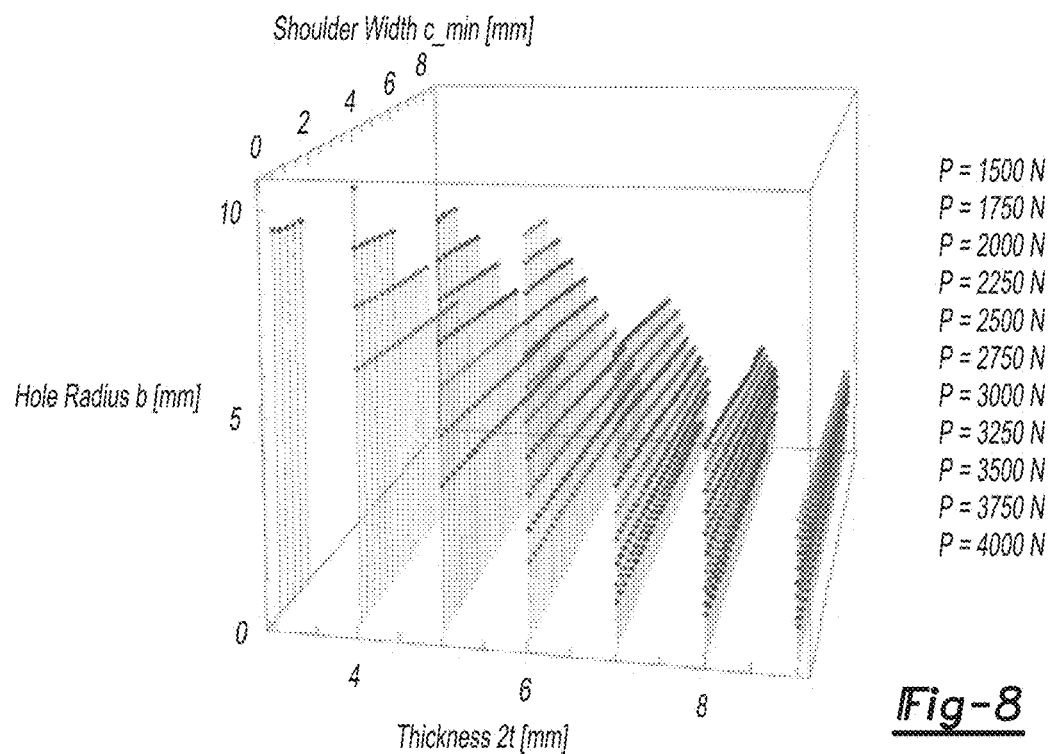
FIG. 8 is a plot of the hole radius, thickness, and shoulder width for various loads.

Referring to FIG. 8, there is shown a plot of the shoulder width, hole radius, and thickness of the secondary substrate 22 for various load parameters. This plot takes into account the design variables of the substrate thickness. The plot is generated utilizing a parametric analysis for various loads and various thicknesses of the secondary substrate 22.

Figure 9:
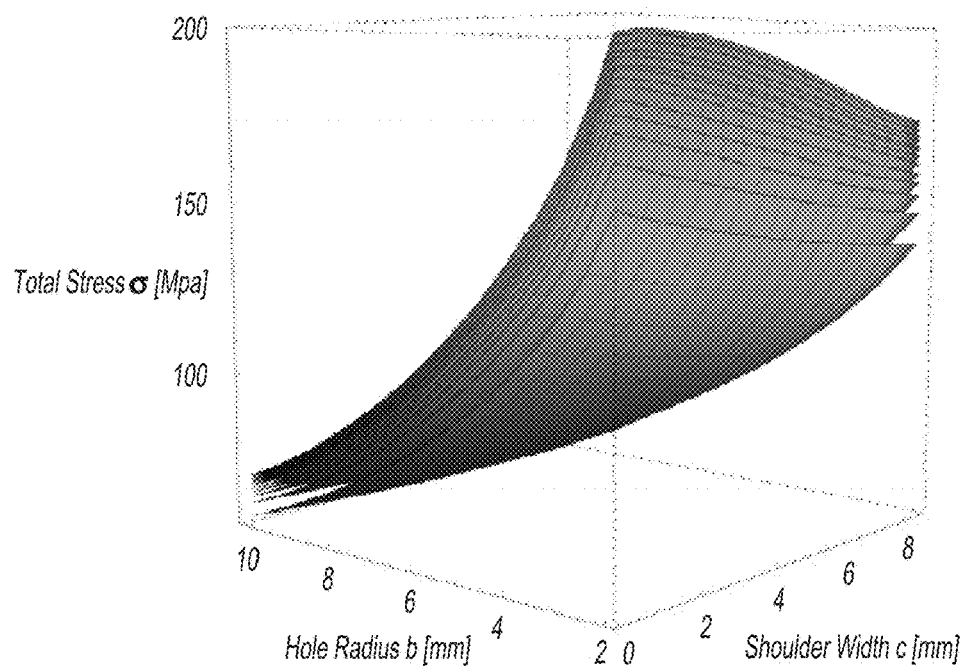
FIG. 9 is a plot of the hole radius, shoulder width, and total stress.

Referring to FIG. 9, there is shown a plot of the hole radius and shoulder width as a function of the total stress. This plot is generated by performing a parametric analysis for the primary and secondary substrates 12, 22 using a tensile modulus of the primary and secondary substrates 12, 22. This plot takes into account the individual strength characteristics of the primary and secondary substrates 12, 22 to meet a specified load condition.

The method provides a verifiable process to create mechanical interlocks 24 between dissimilar primary and secondary substrates 12, 22 using an over-molding process. Various over-molding processes such as injection molding and co-molding as well as compression molding may be utilized. The process will allow specific interlocks 24 to be specified for a desired load application.

We claim:
1. A mechanical coupling assembly comprising:
   a primary member having at least one aperture formed therein, the primary member including a first surface and opposing second surface separated by a material thickness;

a secondary member including at least one mechanical interlock monolithically formed with the secondary member, the at least one mechanical interlock extending through the aperture and spanning the first and second surfaces, the mechanical interlock including a main body disposed proximate the first surface and a head portion disposed proximate the second surface and a transition portion connecting the main body and head portion;

the secondary member having a rib portion in physical contact with the first surface, the main body having a tubular portion extending for a distance from the main body and opposite to the head portion, the rib portion extending away from the tubular portion and along the first surface, and a section of the rib portion proximal to the tubular portion extending for substantially the same distance as the tubular portion and the main body;

wherein the tubular portion is formed longitudinally about the aperture and terminates before the first surface, and the primary member and secondary member are mechanically joined.

2. The mechanical coupling assembly of claim 1 wherein the tubular portion and head portion includes a uniform thickness.

3. The mechanical coupling assembly of claim 1 wherein the main body and head portion extend about the aperture the same distance.

4. The mechanical coupling assembly of claim 1 wherein the primary member is formed of metal and the secondary member is formed of a polymeric material.

5. The mechanical coupling assembly of claim 4 wherein the polymeric material is a fiber reinforced polymeric material.

6. The mechanical coupling assembly of claim 1 wherein the transition portion includes a radial slot formed therein receiving the primary member.

7. The mechanical coupling assembly of claim 1 wherein the tubular portion is sized to define a uniform thickness of the head portion and the main body.

8. The mechanical coupling assembly of claim 1 wherein the secondary member is over-molded onto the primary member.

9. The mechanical coupling assembly of claim 1 wherein the mechanical interlock includes a portion aligned with the aperture and extending from the transition portion and a terminating end of the tubular portion.

10. The mechanical coupling assembly of claim 1 wherein the rib portion extends to and is connected to another part.

11. The mechanical coupling assembly of claim 10 wherein another part is a second mechanical interlock.

12. The mechanical coupling of claim 1 wherein the section of the rib portion proximal to the tubular portion has a first height and a second section of the rib portion spaced apart from the tubular portion has a second height.

13. The mechanical coupling of claim 12 wherein the first height and the second height are substantially equal to one another.

14. A mechanical coupling assembly comprising:
a metal primary member having at least one aperture formed therein, the primary member including a first surface and opposing second surface separated by a material thickness;
a polymeric secondary member including at least one mechanical interlock monolithically formed with the secondary member, the at least one mechanical interlock extending through the aperture and spanning the first and second surfaces, the mechanical interlock including a main body disposed proximate the first surface and a head portion disposed proximate the second surface and a transition portion connecting the main body and head portion;

wherein the main body includes a tubular portion formed longitudinally about the aperture and terminating before the first surface, and wherein the main body and head portion have a uniform thickness and the main body and the primary member and secondary member are mechanically joined, and wherein the main body and head portion extend about the aperture the same distance.

15. The mechanical coupling assembly of claim 14 wherein the polymeric material is a fiber reinforced polymeric material.

16. The mechanical coupling assembly of claim 14 wherein the transition portion includes a radial slot formed therein receiving the primary member.

17. The mechanical coupling assembly of claim 14 wherein the secondary member is over-molded onto the primary member.

18. The mechanical coupling assembly of claim 14 wherein the mechanical interlock includes a portion aligned with the aperture and extending from the transition portion and a terminating end of the tubular portion.

19. The mechanical coupling assembly of claim 14 wherein the secondary member further comprises a rib portion in physical contact with the first surface.

20. The mechanical coupling assembly of claim 19 wherein a section of the rib portion extends for substantially the same distance from the first surface as the tubular portion and the main body.

21. A mechanical coupling assembly comprising:
a metal primary member having at least one aperture formed therein, the primary member including a first surface and opposing second surface separated by a material thickness;
a polymeric secondary member including at least one mechanical interlock monolithically formed with the secondary member, the at least one mechanical interlock extending through the aperture and spanning the first and second surfaces, the mechanical interlock including a main body disposed proximate the first surface, and a head portion disposed proximate the second surface and a transition portion connecting the main body and head portion, the secondary member having a rib portion in physical contact with the first surface, the main body having a tubular portion extending for a distance from the main body and opposite to the head portion, the rib portion extending away from the tubular portion and along the first surface, and a section of the rib portion extending for substantially the same distance from the first surface as the tubular portion and the main body, and
a portion aligned with the aperture and extending from the transition portion and a terminating end of the tubular portion,
wherein the main body, the head portion, the tubular portion, and the rib portion have a uniform thickness and the main body and the primary member and secondary member are mechanically joined.

22. The mechanical coupling assembly of claim 21 wherein the transition portion includes a radial slot formed therein receiving the primary member.

23. The mechanical coupling assembly of claim 21 wherein the tubular portion is sized to define a uniform thickness of the head portion and the main body, and wherein the secondary member is over-molded onto the primary member.

24. A mechanical coupling assembly comprising:
a primary member having at least one aperture formed therein;
a secondary member including a mechanical interlock and a rib portion in physical contact with the primary member, the mechanical interlock having a head portion, a transition portion extending axially through the aperture, a main body, and a tubular portion extending from the main body in an axial direction away from the main body, the rib portion extending along the primary member radially outwardly from the main body and the tubular portion, and a section of the rib portion extending for an axial height substantially equal to a combined axial height of the main body and the tubular portion.

25. The mechanical coupling assembly of claim 24 wherein the secondary member comprises a fiber reinforced polymeric material over-molded onto the primary member.

26. The mechanical coupling assembly of claim 24 wherein the rib portion extends radially outwardly from the main body and the tubular portion of the mechanical interlock to the main body and the tubular portion of an adjacent mechanical interlock.

27. The mechanical coupling assembly of claim 24 wherein the main body, the head portion, the tubular portion, and the rib portion have a uniform thickness and the primary member and the secondary member are mechanically joined.

28. The mechanical coupling assembly of claim 24 wherein a centerline of the tubular portion is aligned with the aperture.

29. The mechanical coupling assembly of claim 24 wherein the head portion and the main body extend about the aperture the same distance.

* * * * *